US012352396B1

(12) United States Patent
Zhang

(10) Patent No.: US 12,352,396 B1
(45) Date of Patent: Jul. 8, 2025

(54) PROJECT LIGHT DEVICE

(71) Applicant: GEMMY INDUSTRIES CORPORATION, Coppell, TX (US)

(72) Inventor: Cheng-Chun Zhang, Shenzhen (CN)

(73) Assignee: GEMMY INDUSTRIES CORPORATION, Coppell, TX (US)

( * ) Notice: Subject to any disclaimer, the term of this patent is extended or adjusted under 35 U.S.C. 154(b) by 0 days.

(21) Appl. No.: 18/953,033

(22) Filed: Nov. 19, 2024

(51) Int. Cl.

| | |
|---|---|
| ***F21L 2/00*** | (2006.01) |
| ***F21V 21/10*** | (2006.01) |
| ***F21V 21/30*** | (2006.01) |
| ***F21V 23/00*** | (2015.01) |
| ***F21V 29/83*** | (2015.01) |
| ***F21Y 113/00*** | (2016.01) |

(52) U.S. Cl.
CPC ................ *F21L 2/00* (2013.01); *F21V 21/10* (2013.01); *F21V 21/30* (2013.01); *F21V 23/003* (2013.01); *F21V 29/83* (2015.01); *F21Y 2113/00* (2013.01)

(58) Field of Classification Search
CPC .. F21L 2/00; F21V 29/83; F21V 21/20; F21V 21/30; F21V 23/003
See application file for complete search history.

(56) References Cited

U.S. PATENT DOCUMENTS 5,481,441 A * 1/1996 Stevens ................ B60Q 1/2611 362/418
5,964,524 A * 10/1999 Qian ....................... F21V 21/06 362/431
6,474,844 B1 * 11/2002 Ching ..................... F21V 21/22 362/427
10,094,542 B2 * 10/2018 Chauvet ................ F21V 23/003
11,262,020 B2 * 3/2022 Wenzel .................. F16M 11/04
2002/0126492 A1 * 9/2002 Ching .................... F16M 11/28 362/419
2003/0137847 A1 * 7/2003 Cooper ................ F21V 21/088 362/418
2003/0174503 A1 * 9/2003 Yueh ...................... F21V 21/22 362/249.07
2006/0146550 A1 * 7/2006 Simpson ................ F21V 23/06 362/431
2006/0279948 A1 * 12/2006 Tsai ....................... F16M 11/16 362/413

(Continued)

*Primary Examiner* — Bryon T Gyllstrom
(74) *Attorney, Agent, or Firm* — Hershkovitz & Associates, PLLC; Abe Hershkovitz

(57) ABSTRACT

A project light device comprises multiple light assemblies and at least one pivotable connecting assembly. The at least one pivotable connecting assembly is connected between two adjacent light assemblies. Each light assembly comprises a shell, and a light-emitting module and a light-concentrating structure that are mounted inside the shell. The light-concentrating structure concentrates light emitted from the light-emitting module to project light out of the shell. The at least one pivotable connecting assembly comprises a joint seat, a middle pivotable rod and a joint rod. The joint seat and the joint rod are respectively mounted at two adjacent light assemblies. The joint rod is pivotably mounted at the middle pivotable rod pivotably mounted at the joint seat. The two adjacent light assemblies are connected through the pivotable connecting assembly, thereby being pivotable relative to each other, so the light assemblies project lights to different directions.

20 Claims, 9 Drawing Sheets

(56) References Cited

U.S. PATENT DOCUMENTS

| | | | | |
|---|---|---|---|---|
| 2007/0223239 | A1* | 9/2007 | Thompson .............. | F21L 14/02 362/399 |
| 2010/0142213 | A1* | 6/2010 | Bigge ..................... | F21V 21/30 362/430 |

* cited by examiner

PROJECT LIGHT DEVICE

BACKGROUND OF THE INVENTION

1. Field of the Invention

The present invention relates to a project light device, especially to a project light device that projects light.

2. Description of Related Art

Nowadays, people pay more attention to the environmental ambiance, so they set up a lighting device or use the lighting device to light up environmental objects, such as trees or buildings, to create a unique ambiance.

A conventional project light device is used to light up environmental objects and comprises a lamp shell and a light-emitting module mounted inside the lamp shell. The project light device is set on the ground or on the wall and faced toward the to-be-lit environmental objects. Then the light-emitting module is turned on to emit light, so the environmental objects are lit up.

However, the conventional project light device can only project light toward one direction and cannot project light toward multiple directions at the same time. If multiple environmental objects are to be lit, multiple conventional project lights are needed. Further, each one of the multiple conventional project lights has to be set respectively to adjust the position and the angle it faces toward. Therefore, it is rather inconvenient.

SUMMARY OF THE INVENTION

A project light device in accordance with the present invention is provided to resolve drawbacks that a conventional project light device projects light to only one direction. To light up multiple environmental objects, multiple conventional project light devices are needed to be set up and adjusted for positions and facing angles, therefore being rather inconvenient.

The project light device comprises multiple light assemblies and at least one pivotable connecting assembly. The multiple light assemblies are arranged adjacently, and the at least one pivotable connecting assembly is connected between two adjacent said light assemblies. Each one of the multiple light assemblies comprises a shell, a light-emitting module, and a light-concentrating structure. The shell is hollow and comprises a light-passing cover mounted at a side of the shell. The light-emitting module is mounted inside the shell and comprises at least one light-emitting unit facing toward the light-passing cover and being able to emit light. The light-concentrating structure is mounted inside the shell, is disposed between the light-emitting module and the light-passing cover, and comprises at least one condenser lens. The at least one condenser lens corresponds to the at least one light-emitting unit, concentrates the light, and makes the light emit toward the light-passing cover. The at least one pivotable connecting assembly comprises a joint seat, a middle pivotable rod, and a joint rod. The joint seat is mounted at one of the two adjacent light assemblies and has a joint hole. The middle pivotable rod comprises a pivotable connecting end, which is pivotably mounted at the joint hole of the joint seat, and comprises a pivot hole. The joint rod is mounted at the other one of the two adjacent light assemblies and is pivotably mounted at the pivot hole of the middle pivotable rod. The two adjacent light assemblies are connected to each other through the at least one pivotable connecting assembly, thereby being pivotable relative to each other.

The project light device has the advantage that it can project lights toward different directions simultaneously. The project light device comprises the multiple light assemblies, and two adjacent said light assemblies are connected to each other through the at least one pivotable connecting assembly, and thereby can pivot relative to each other. Therefore, after setting up the project light device, projecting directions and angles of the multiple light assemblies can be adjusted respectively. The multiple light assemblies can project lights toward different directions without the need to respectively adjust positions and setting angles, effectively increasing convenience in use. Furthermore, the light emitted from the at least one light-emitting unit of the light-emitting module of each one of the multiple light assemblies is concentrated through the at least one condenser lens corresponding to the at least one light-emitting unit before being projected toward the light-passing cover. Therefore, intensity of the lights projected from the multiple light assemblies is enhanced, increasing decorative ability and saving energy.

DETAILED DESCRIPTION OF THE PREFERRED EMBODIMENTS

With reference to the drawings and preferable embodiments in accordance with the present invention, descriptions below are to elaborate technical means to achieve intended purpose of the present invention.

Figure 1:
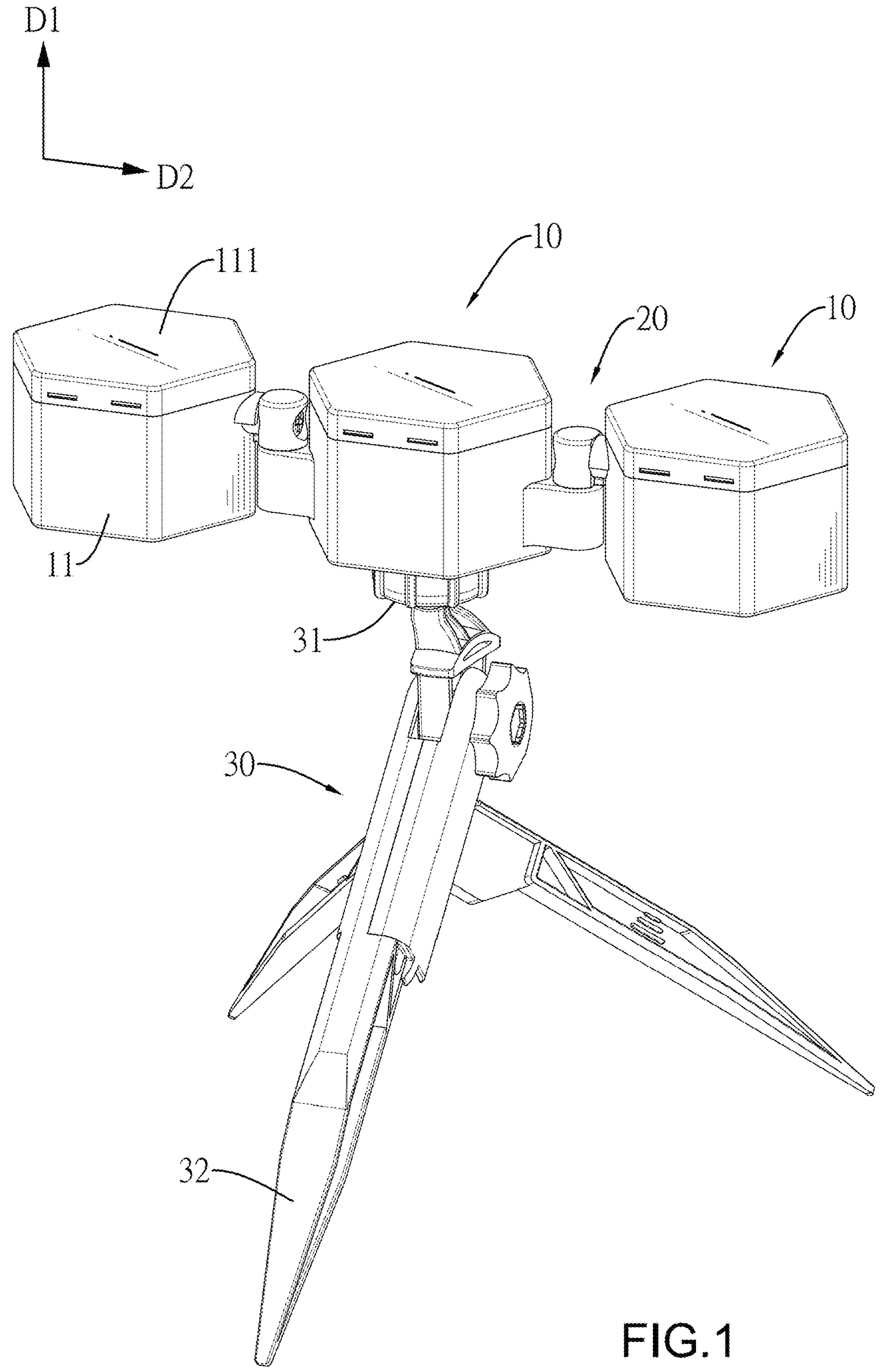
FIG. 1 is a perspective view of an embodiment of a project light device in accordance with the present invention.
Figure 2:
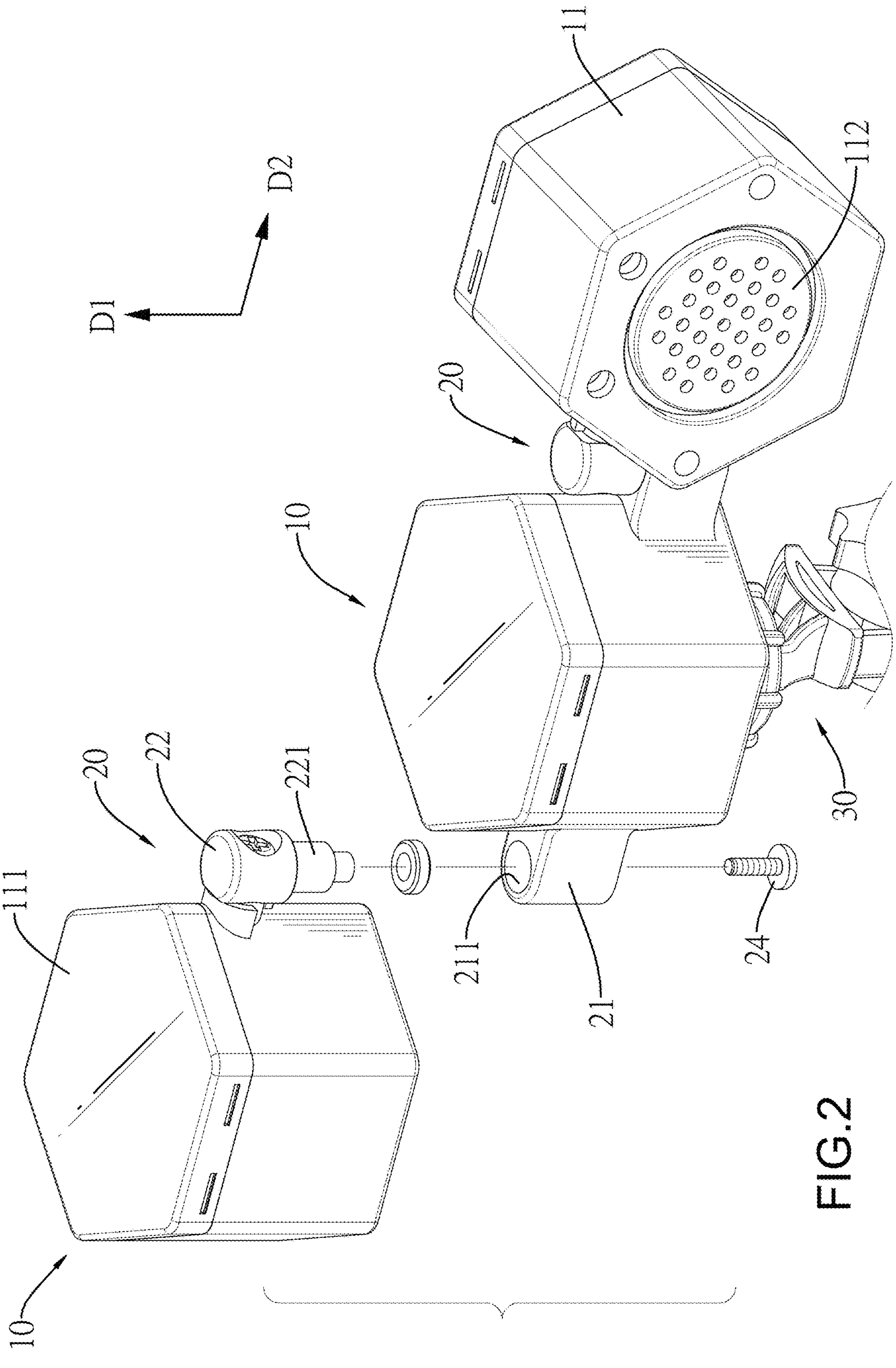
FIG. 2 is a partially exploded view of the project light device.

With reference to FIGS. 1 and 2, an embodiment of a project light device in accordance with the present invention comprises multiple light assemblies 10 and at least one pivotable connecting assembly 20.

Figure 3:
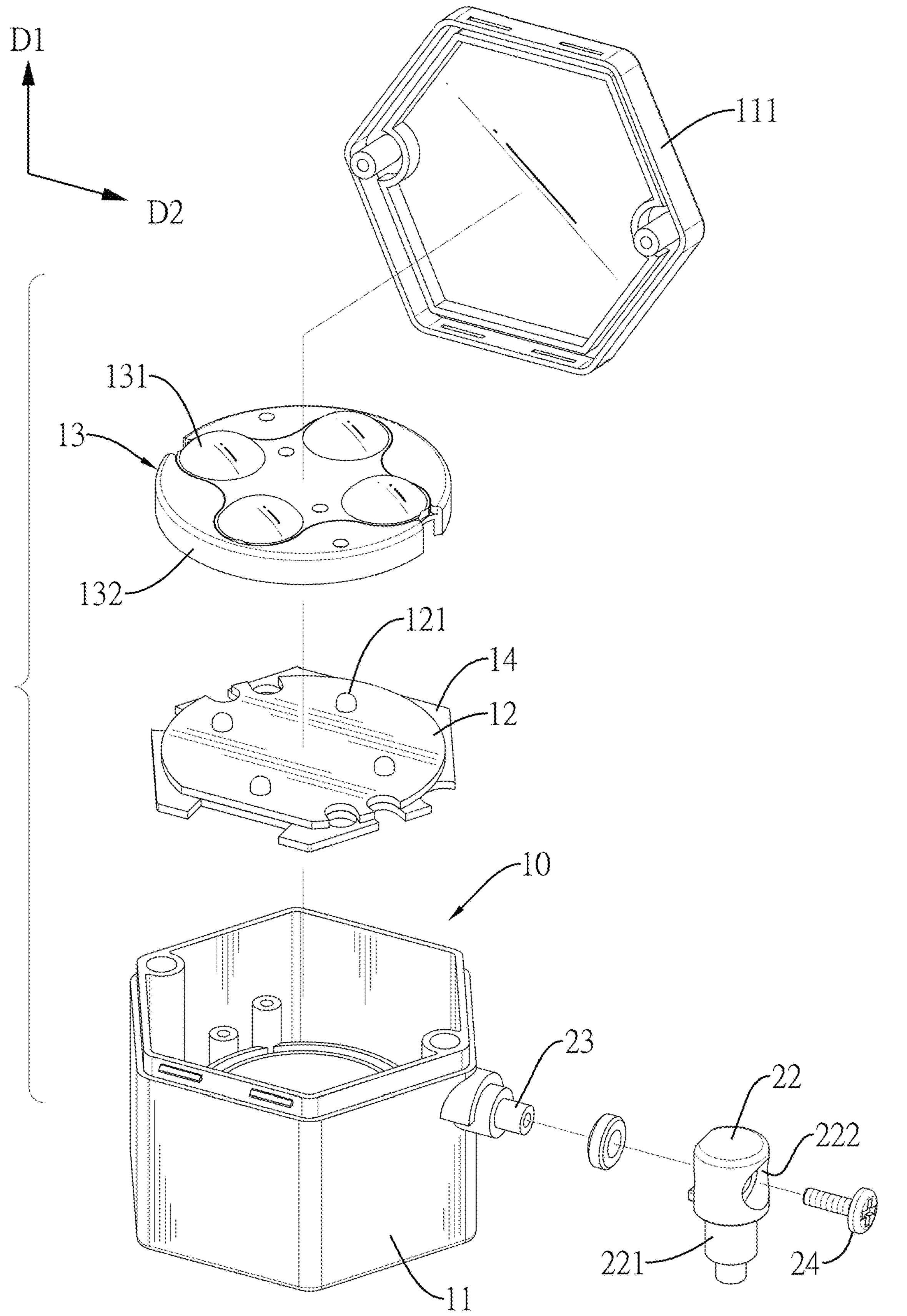
FIG. 3 is an exploded view of a light assembly of the project light device.

As shown in FIGS. 1 to 3, the multiple light assemblies 10 are arranged adjacently. Each one of the multiple light assemblies 10 comprises a shell 11, a light-emitting module 12 and a light-concentrating structure 13.

As shown in FIGS. 2 and 3, the shell 11 is hollow and comprises a light-passing cover 111, which is mounted at a side of the shell 11.

Figure 4:
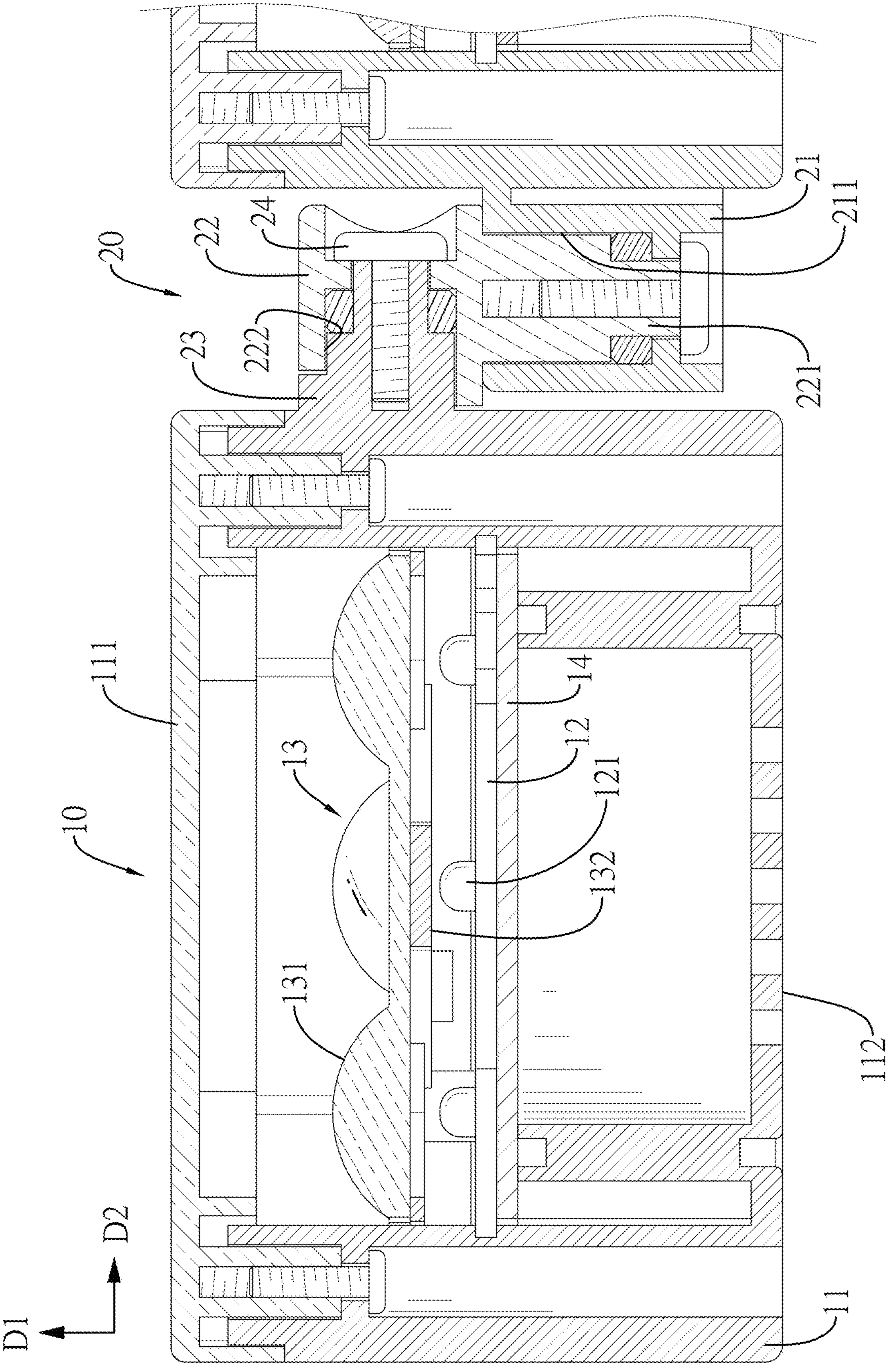
FIG. 4 is a front sectional view of the light assembly of the project light device.

As shown in FIGS. 3 and 4, the light-emitting module 12 is mounted inside the shell 11 and comprises at least one light-emitting unit 221 facing toward the light-passing cover 111 and can emit light.

As shown in FIGS. 3 and 4, the light-concentrating structure 13 is mounted inside the shell 11 and is disposed between the light-emitting module 12 and the light-passing cover 111. The light-concentrating structure 13 comprises at least one condenser lens 131 corresponding to the at least one light-emitting unit 221, concentrating the light, and projecting the light toward the light-passing cover 111.

As shown in FIGS. 2 to 4, the at least one pivotable connecting assembly 20 is connected between two adjacent light assemblies 10. To be more specific, one pivotable connecting assembly 20 is connected between two light assemblies 10. The at least one pivotable connecting assembly 20 comprises a joint seat 21, a middle pivotable rod 22 and a joint rod 23. The joint seat 21 is mounted at one of the two adjacent light assemblies 10 and has a joint hole 211. The middle pivotable rod 22 comprises a pivotable connecting end 221 and a pivot hole 222. The pivotable connecting end 221 is pivotably mounted at the joint hole 211 of the joint seat 21. The joint rod 23 is mounted at the other one of the two adjacent light assemblies 10 and is pivotably mounted at the pivot hole 222 of the middle pivotable rod 22. The two adjacent light assemblies 10 are connected to each other through the at least one pivotable connecting assembly 20, thereby being pivotable relative to each other.

As shown in FIGS. 5 to 9, the project light device can project lights toward different directions simultaneously. The project light device comprises the multiple light assemblies 10, and two adjacent said light assemblies 10 are connected through the at least one pivotable connecting assembly 20 and so can pivot relative to each other. Therefore, after setting up the project light device, projecting directions and angles of the multiple light assemblies 10 can be adjusted respectively. The multiple light assemblies 10 can project lights toward different directions without being respectively adjusted with positions and setting angles, effectively increasing convenience in use.

Figure 5:
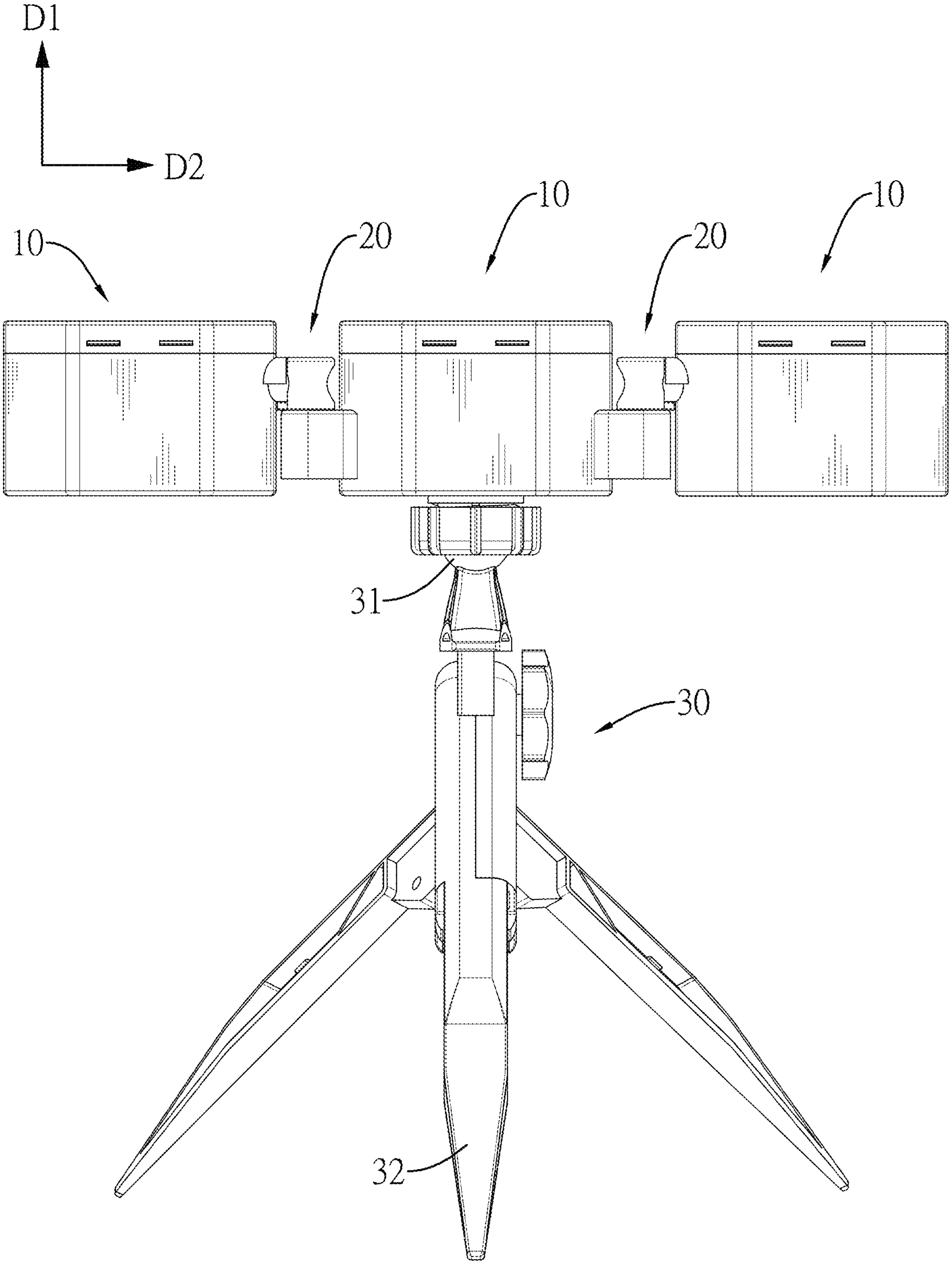
FIG. 5 is a front view of the light assembly of the project light device.

Additionally, as shown in FIGS. 1 and 5, the project light device comprises a ground post 30 pivotably connected to one of the multiple light assemblies 10 and connected to the shell 11 of said light assembly 10. The project light device can be easily and steadily mounted on the ground through the ground post 30, thereby facilitating ease in installation of the project light device.

Preferably, as shown in FIGS. 2 to 4, the pivotable connecting end 221 of the middle pivotable rod 22 of the at least one pivotable connecting assembly 20 extends along a first direction D1. The pivot hole 222 of the middle pivotable rod 22 extends along a second direction D2. The first direction D1 and the second direction D2 are non-parallel. In this embodiment, the first direction D1 and the second direction D2 are perpendicular.

Figure 6:
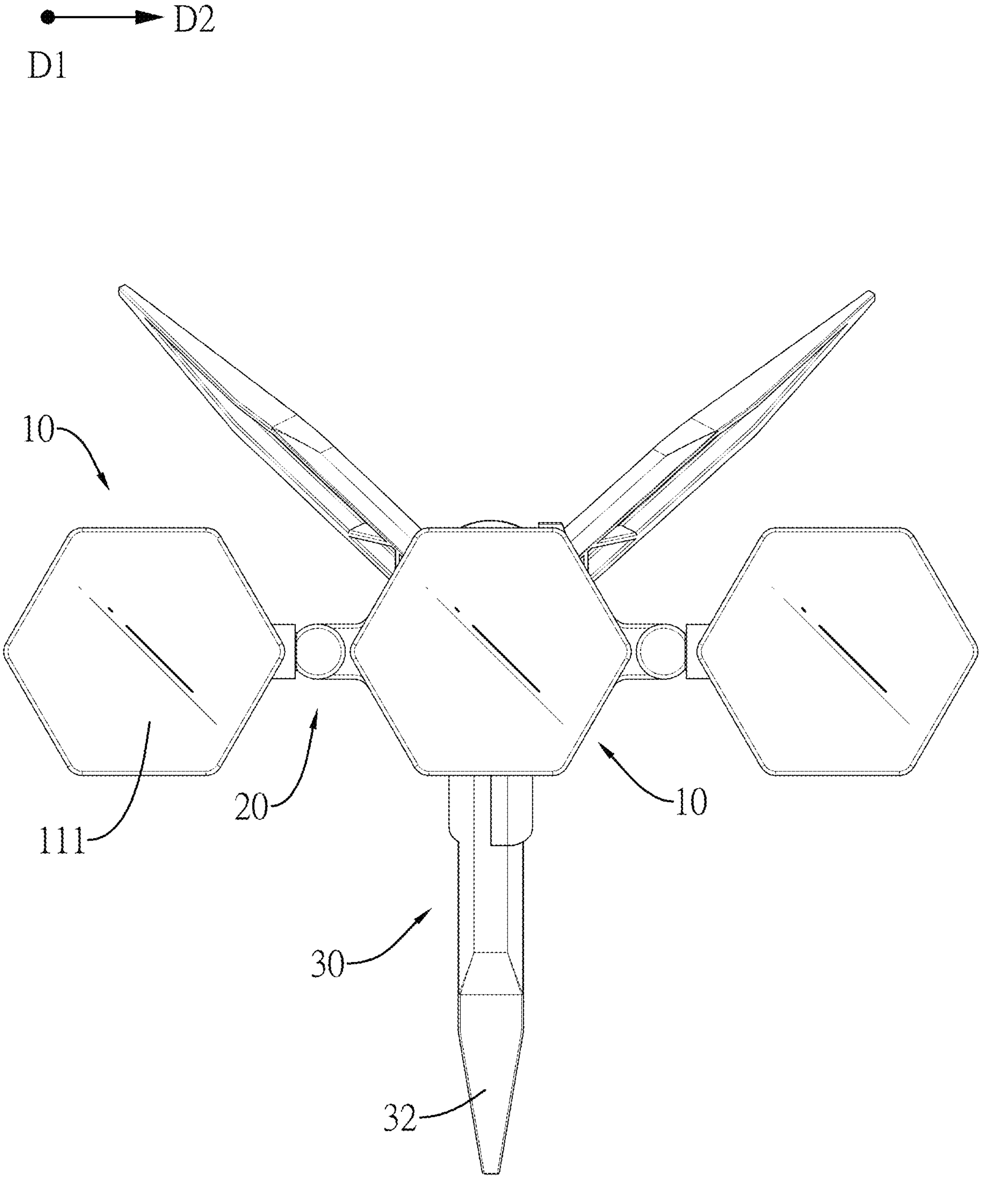
FIG. 6 is a top view of the light assembly of the project light device.

As shown in FIGS. 5 and 6, in this embodiment, an amount of the multiple light assemblies 10 is three, and an amount of the at least one pivotable connecting assembly 20 is two. The ground post 30 is connected to the middle one of the three light assemblies 10. The joint seats 21 of the two pivotable connecting assemblies 20 are respectively mounted at two opposite sides of the middle light assembly 10. The three light assemblies 10 are arranged in a line.

Figure 7:
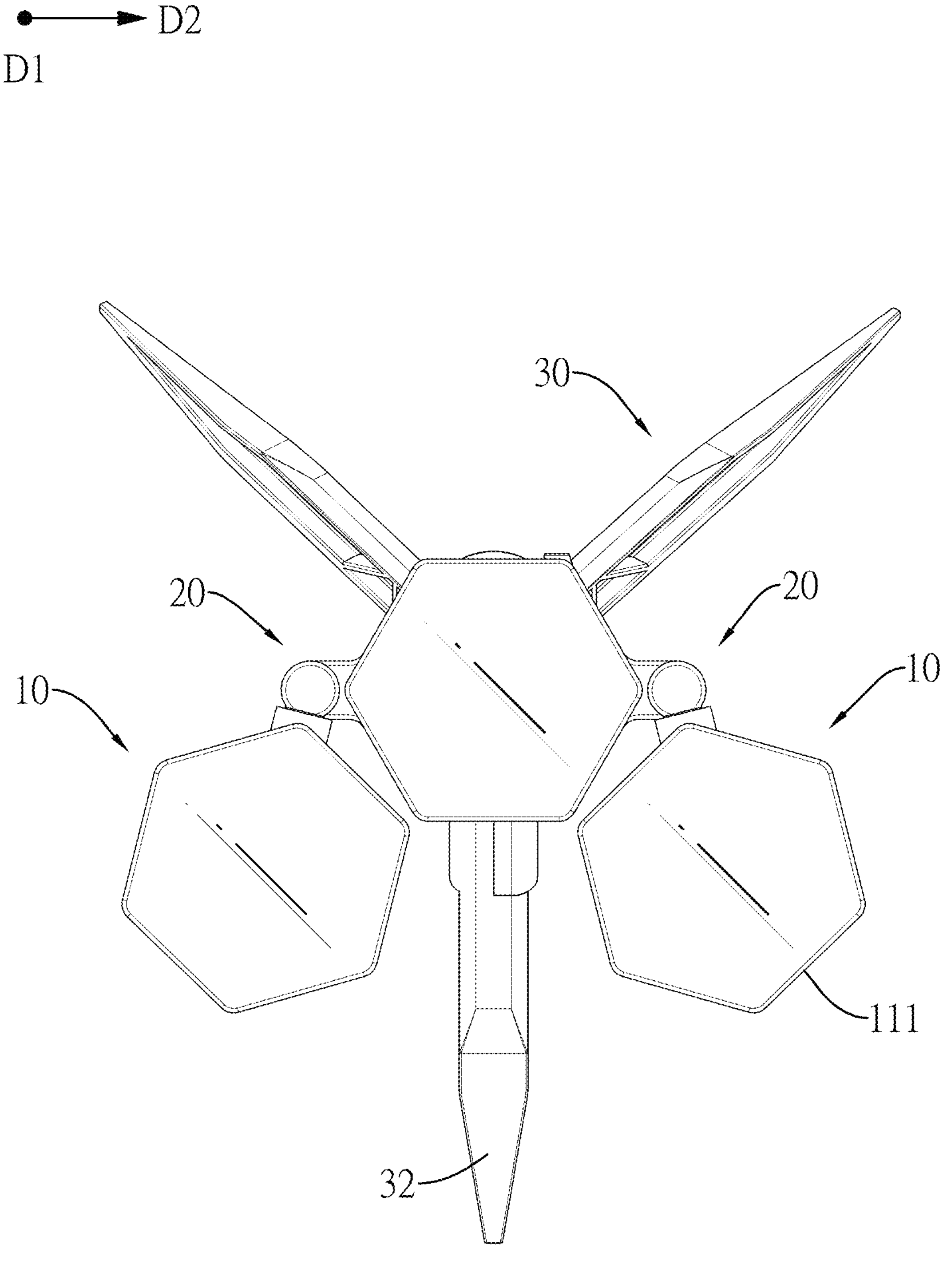
FIGS. 7 to 9 are top views of multiple light assemblies of the project light device, facing toward different directions.
Figure 8:
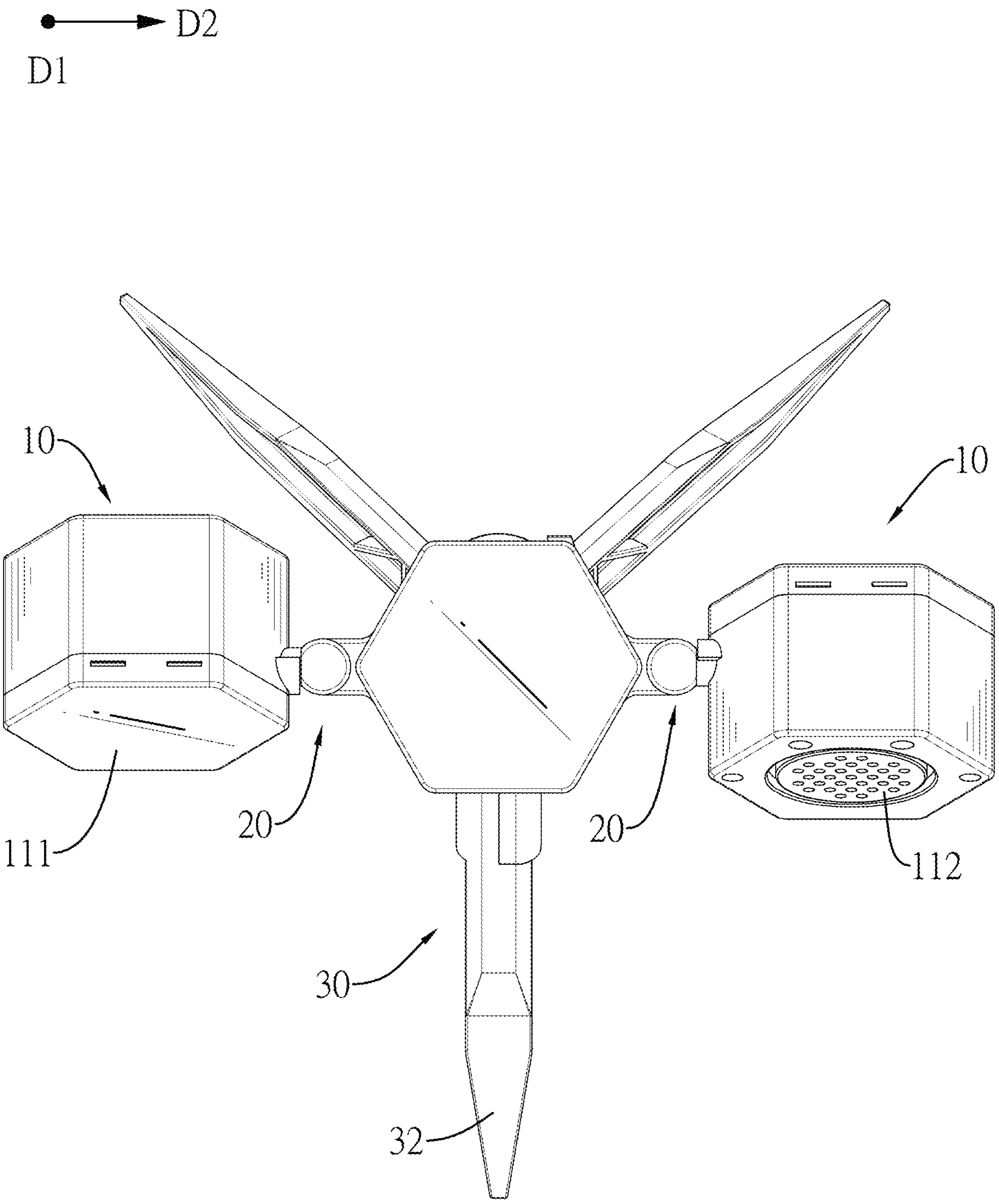
Figure 9:
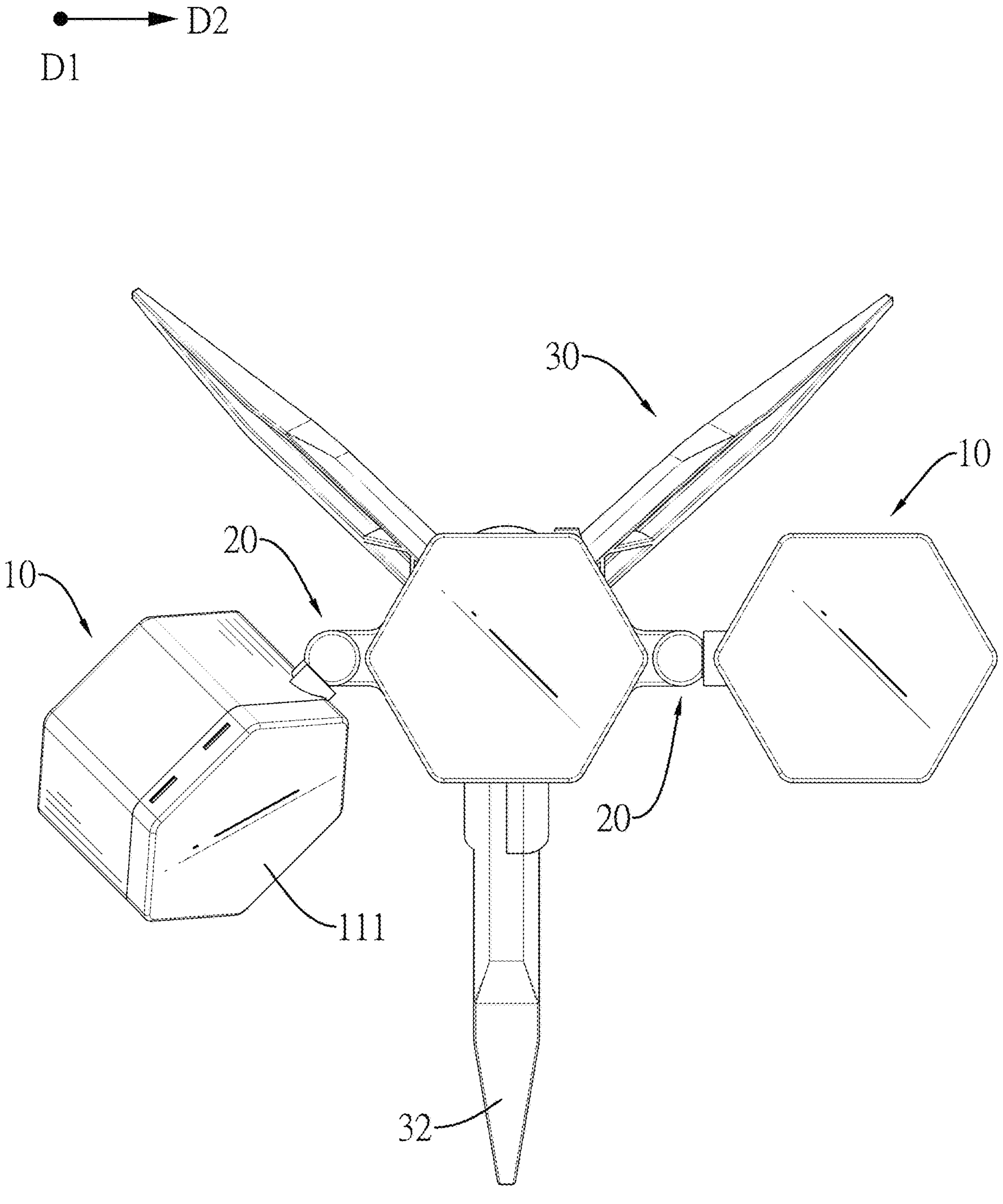

In addition, as shown in FIGS. 6 and 7, when pivoting the multiple light assemblies 10 axially along the first direction D1, the joint rod 23 and the middle pivotable rod 22 of the at least one pivotable connecting assembly 20 are pivoted relative to the joint seat 21. So, an arrangement of the multiple light assemblies 10 is adjusted. Besides, as shown in FIG. 8, when pivoting the multiple light assemblies 10 axially along the second direction D2, the joint rod 23 of the at least one pivotable connecting assembly 20 is pivoted relative to the middle pivotable rod 22. So, projecting directions and angles of the multiple light assemblies 10 are adjusted. Additionally, as shown in FIG. 9, when pivoting the multiple light assemblies 10 axially along the first direction D1 and the second direction D2, the arrangement, the projecting directions and angles of the multiple light assemblies 10 are adjusted simultaneously. Therefore, the multiple light assemblies 10 can project lights toward different directions, or the multiple light assemblies 10 can project light toward the same spot to increase brightness.

In addition, as shown in FIGS. 2 to 4, the at least one pivotable connecting assembly 20 comprises multiple screws 24. The pivotable connecting end 221 is mounted at one of two opposite ends of the joint hole 211 of the joint seat 21. One of the multiple screws 24 extends into the other end of the joint hole 211 of the joint seat 21 and is screwed into the pivotable connecting end 221. The joint rod 23 is mounted at one of two opposite ends of the pivot hole 222 of the middle pivotable rod 22. One of the multiple screws 24 extends into the other end of the pivot hole 222 of the middle pivotable rod 22 and is screwed into the joint rod 23. Adjusting the multiple screws 24 can fix the projecting directions and angles of the multiple light assemblies 10.

Preferably, as shown in FIGS. 1 and 5, the ground post 30 comprises a universal connecting mechanism 31 and three supporting sticks 32. The three supporting sticks 32 are connected to one end of the universal connecting mechanism 31, and another end of the universal connecting mechanism 31 is connected to the shell 11 of one of the multiple light assemblies 10. The three supporting sticks 32 are foldable. In addition, setting the project light device on the ground through the three supporting sticks 32 increases stability. The three supporting sticks 32 can be folded, hence facilitating ease in storage. Besides, the universal connecting mechanism 31 is connected between the light assemblies 10 and the three supporting sticks 32. So, angles of the multiple light assemblies 10 relative to the ground on which the ground post 30 is set can be adjusted, further enlarging adjustable scopes of projecting directions and angles of the multiple light assemblies 10.

Furthermore, as shown in FIGS. 3 and 4, the light emitted from the at least one light-emitting unit 221 of the light-emitting module 12 of each one of the multiple light assemblies 10 is concentrated through the at least one condenser lens 131 corresponding to the at least one light-emitting unit 221 before being projected toward the light-passing cover 111. Therefore, intensity of the lights projected from the multiple light assemblies 10 is enhanced, increasing decorative ability and saving energy.

Additionally, as shown in FIGS. 3 and 4, the light-concentrating structure 13 comprises an installing board 132. The at least one condenser lens 131 is mounted on the installing board 132.

In addition, as shown in FIGS. 2 and 4, the shell 11 comprises a heat-dissipation-hole portion 112 having multiple heat-dissipation holes through the shell 11. The heat-dissipation-hole portion 112 dissipates heat generated by the light-emitting module 12 away from the shell 11, thereby increasing heat-dissipation ability. Preferably, the light-passing cover 111 and the heat-dissipation-hole portion 112 are disposed at two opposite sides of the shell 11.

Furthermore, as shown in FIGS. 3 and 4, each one of the multiple light assemblies 10 comprises a heat-dissipation board 14 mounted inside the shell 11 and connected to the light-emitting module 12. The heat-dissipation board dissipates heat generated by the light-emitting module 12, thereby increasing heat-dissipation ability.

Additionally, in another configuration of the light-passing cover 111, the light-passing cover 111 further comprises a figure. The figure is set on the light-passing cover 111, so when the light emitted by the light-emitting module passes through the light-passing cover 111, a projecting pattern corresponding to the figure is projected to the environmental objects toward which the project light device projects light, thereby providing a decorative effect.

Besides, in this embodiment, as shown in FIGS. 3 and 4, an amount of the at least one light-emitting unit 221 of the light-emitting module 12 is multiple. Each one of the multiple light-emitting units 221 emits lights in multiple colors. Therefore, the environmental objects projected by the multiple light assemblies 10 have different colors to provide decorative effect.

Furthermore, the light-emitting module 12 comprises a controlling unit electrically connected to the at least one light-emitting unit 221. The controlling unit controls the at least one light-emitting unit 221 to turn on or off, controls time periods during which the at least one light-emitting unit 221 turns on or off, and controls the at least one light-emitting unit 221 to emit lights in different colors. The controlling unit of the light-emitting module 12 of each one of the multiple light assemblies 10 controls the at least one light-emitting unit 221 of the light-emitting module 12 to emit lights in different colors and controls the at least one light-emitting unit 221 to turn on or off, so that the project light device provides decorative lighting effect according to needs.

To sum up, the multiple light assemblies 10 of the project light device project lights toward different directions simultaneously without being respectively set with positions and setting angles, effectively increasing convenience in use. The light-concentrating structure 13 concentrates the lights emitted from the light-emitting module 12 to enhance light intensity and save power. Besides, the multiple light assemblies 10 can project lights in different colors to provide decorative effect.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A project light device comprising:
multiple light assemblies arranged adjacently; each one of the multiple light assemblies comprising
a shell being hollow and comprising
a light-passing cover mounted at a side of the shell;
a light-emitting module mounted inside the shell and comprising
at least one light-emitting unit facing toward the light-passing cover and being able to emit light;
a light-concentrating structure mounted inside the shell, disposed between the light-emitting module and the light-passing cover, and comprising
at least one condenser lens corresponding to the at least one light-emitting unit, concentrating the light, and making the light emit toward the light-passing cover;
at least one pivotable connecting assembly disposed between and connecting two adjacent said light assemblies; the at least one pivotable connecting assembly comprising
a joint seat mounted at one of the two adjacent light assemblies and having
a joint hole;
a middle pivotable rod comprising
a pivotable connecting end pivotably mounted at the joint hole of the joint seat;
a pivot hole;
a joint rod mounted at the other one of the two adjacent light assemblies and pivotably mounted at the pivot hole of the middle pivotable rod; and
the two adjacent light assemblies connected to each other through the at least one pivotable connecting assembly, thereby being pivotable relative to each other.

2. The project light device as claimed in claim 1, wherein
the pivotable connecting end of the middle pivotable rod of the at least one pivotable connecting assembly extends along a first direction;
the pivot hole of the middle pivotable rod extends along a second direction; and
the first direction and the second direction are non-parallel to each other.

3. The project light device as claimed in claim 2, wherein the project light device comprises
a ground post pivotably mounted at one of the multiple light assemblies and connected to the shell of said light assembly.

4. The project light device as claimed in claim 3, wherein the ground post comprises
a universal connecting mechanism having two ends; one of the two ends of the universal connecting mechanism connected to the shell of the light assembly; and
three supporting sticks connected to the other end of the two ends of the universal connecting mechanism and being foldable.

5. The project light device as claimed in claim 4, wherein the shell comprises
a heat-dissipation-hole portion having multiple heat-dissipation holes through the shell.

6. The project light device as claimed in claim 5, wherein the light-passing cover and the heat-dissipation-hole portion are disposed at two opposite sides of the shell.

7. The project light device as claimed in claim 1, wherein the project light device comprises
a ground post pivotably mounted at one of the multiple light assemblies and connected to the shell of said light assembly.

8. The project light device as claimed in claim 7, wherein the ground post comprises
a universal connecting mechanism having two ends; one of the two ends of the universal connecting mechanism connected to the shell of the light assembly;
three supporting sticks connected to the other end of the two ends of the universal connecting mechanism and being foldable.

9. The project light device as claimed in claim 1, wherein the shell comprises
a heat-dissipation-hole portion having multiple heat-dissipation holes through the shell.

10. The project light device as claimed in claim 9, wherein the light-passing cover and the heat-dissipation-hole portion are disposed at two opposite sides of the shell.

11. The project light device as claimed in claim 1, wherein each one of the multiple light assemblies comprises
a heat-dissipation board mounted inside the shell and connected to the light-emitting module.

12. The project light device as claimed in claim 6, wherein each one of the multiple light assemblies comprises
a heat-dissipation board mounted inside the shell and connected to the light-emitting module.

13. The project light device as claimed in claim 12, wherein the light-passing cover comprises a figure.

14. The project light device as claimed in claim 13, wherein an amount of the at least one light-emitting unit of the light-emitting module is multiple.

15. The project light device as claimed in claim 14, wherein the multiple light-emitting units emit lights in multiple colors.

16. The project light device as claimed in claim 15, wherein the light-emitting module comprises a controlling unit electrically connected to the at least one light-emitting unit, controlling the at least one light-emitting unit to turn on or turn off, and controlling time periods during which the at least one light-emitting unit turns on or turns off.

17. The project light device as claimed in claim 1, wherein the light-passing cover comprises a figure.

18. The project light device as claimed in claim 1, wherein an amount of the at least one light-emitting unit of the light-emitting module is multiple.

19. The project light device as claimed in claim 1, wherein the at least one light-emitting unit emits lights in multiple colors.

20. The project light device as claimed in claim 1, wherein the light-emitting module comprises a controlling unit electrically connected to the at least one light-emitting unit, controlling the at least one light-emitting unit to turn on or turn off, and controlling time periods during which the at least one light-emitting unit turns on or turns off.

* * * * *